United States Patent [19]

Wu et al.

[11] Patent Number: 4,793,177
[45] Date of Patent: Dec. 27, 1988

[54] COMBINATION TIRE VALVE AND PRESSURE GAUGE

[76] Inventors: Min-Yu Wu; Andrew H. Wu, both of 1219 Brandybuck Way, San Jose, Calif. 95121

[21] Appl. No.: 122,842

[22] Filed: Nov. 19, 1987

[51] Int. Cl.⁴ .................. B60C 23/02; G01L 7/06
[52] U.S. Cl. ..................... 73/146.8; 73/729; 116/34 R
[58] Field of Search .............. 73/146.8, 146.3, 729; 116/34 R

[56] References Cited

U.S. PATENT DOCUMENTS

| 1,136,901 | 4/1915 | Myers | 73/146.8 |
| 1,400,848 | 12/1921 | Anderson | 73/146.8 |
| 1,411,917 | 4/1922 | Harris | 73/146.8 |
| 2,190,530 | 2/1940 | Clarkson | 73/146.8 |

*Primary Examiner*—Donald O. Woodiel
*Attorney, Agent, or Firm*—Robert O. Guillot

[57] ABSTRACT

A tire valve having a pressure gauge disposed therewithin. The pressure gauge mechanism includes a bellows that is mechanically connected through worm gears to a rotary drum tire pressure indicator. A clear window formed through the valve permits viewing of pressure-indicating numerals on the drum.

2 Claims, 2 Drawing Sheets

COMBINATION TIRE VALVE AND PRESSURE GAUGE

BACKGROUND OF THE INVENTION

1. Field of the Invention

The present invention relates to air pressure valves and gauges and more particularly to a tire valve having a pressure gauge combined therewithin.

2. Description of the Prior Art

Present tire valve stems are designed simply to house a valve to regulate the flow of air into and out of tires. In order to measure the pneumatic pressure within a tire, a separate tire gauge must be used, and this involves much time and inconvenience. Without properly inflated tires, a motor vehicle's handling and braking ability is greatly reduced, while the rate of gasoline consumption and tire wear is increased.

A tire valve stem with a built-in pressure indicator will eliminate the need to carry a separate tire gauge to measure the pneumatic pressure of a tire. Reading the air pressure of a tire can be accomplished at a glance. There is no need to unfasten a valve cap, or to insert a tire gauge into the nozzle. The present design configuration is arranged in a manner which will allow for the constant monitoring of pneumatic tire pressure. It is intended to aid in the promotion of traffic and air safety while reducing the rate of unnecessary gasoline consumption and tire wear.

The practical incorporation of an air pressure gauge within a tire valve stem has long been attempted. Prior art patents such as U.S. Pat. Nos. 1,400,848, Pressure Gage, issued Dec. 20, 1921 to T. W. Anderson, 1,606,740, Tire Stem Pressure Gauge, issued Nov. 16, 1926 to A. Badowski, and 3,246,679, Combination Valve and Pressure Gauge, issued Apr. 19, 1966 to E. J. Stealy, exemplify significant prior art. In each of the above-mentioned patents, a pressure gauge is incorporated within the dimensional confines of a tire valve stem.

Anderson teaches a pressure gauge incorporated within a valve stem (see FIG. 2), having an elastic diaphragm G which, per column 1, line 52, may include other pressure responsive means. The diaphragm is restrained by a calibrated spring K, and a rod L extends through a hole in a support head W to terminate in a rack N. The rack N meshes with a pinion O residing on a shaft P which also holds a beveled gear Q which meshes with a beveled gear R disposed on a rotatable shaft S. The rotatable shaft S contains a rotary pressure indicator M having numerals disposed thereon which are viewed through a window T. An air channel C is disposed in the wall of the tire stem to transmit air from the check valve B to the tire. It is therefore to be appreciated that Anderson teaches a relevant but complicated mechanism.

Badowski, U.S. Pat. No. 1,606,740, teaches a tire stem pressure gauge device which includes a bellows-type extensible member 17 which expands in its length within the tire stem depending upon the tire pressure. The bellows 17 is apparently engaged to a vertically-extending pressure indicator 14 which displays tire pressure as a direct function of the extension of the bellows-type member 17. The Badowski device is designed to accommodate tire stems differing in design from those currently available, and it is not readily apparent how this design could be accommodated within tire stems currently available.

Stealy, U.S. Pat. No. 3,246,679, teaches a combination valve and pressure gauge which is incorporated within the conically-shaped tire valve stem designs currently utilized. In Stealy, a pressure-sensitive elastic chamber 62 communicates through bore 60 with the inner tire air pressure. The chamber 62 expands against a calibrated spring 64 and a rod 54 projects through the upward portions of the tire stem and terminates in an indicator 55. Thus, the longitudinal extension of the elastic chamber 62 is directly reflected in the longitudinal extension of the indicator 55. Tire pressure markings are disposed upon a clear tire valve cap 15 to correlate with the outward extension of the indicator 55. Thus, a drawback to the Stealy device is that the tire cap 15 must be fully screwed onto the tire valve nozzle in order to determine the pressure within the tire. A user, upon inflating the tire, might have to screw the cap onto the nozzle several times to achieve the desired pressure.

Other patents of interest are U.S. Pat. Nos. 1,268,467, Pressure Connection and Gage, issued to C. I. Jacobson and A. L. Fowler, June 4, 1918; 4,058,099, Arrangement for Monitoring Pneumatic Tire Inflation Pressure, issued to Etter-Felix on Nov. 15, 1977; 4,244,214, Visual Tire Valve, issued to William F. Curran on Jan. 13, 1981. Jacobson, 1,268,467, depicts a complicated device that is not readily understandable but appears to be less relevant than Anderson, Badowski or Stealy. Etter-Felix, U.S. Pat. No. 4,058,009, teaches a device which is not readily substitutable for a tire valve stem, and does not appear to be as pertinent as Anderson, Badowski or Stealy. Curran, U.S. Pat. No. 4,244,214, teaches a tire valve for mounting over a valve stem and is therefore not a device designed to be incorporated within a valve stem. Curran includes a window which depicts one of the three different colored bands to indicate over-inflation, proper inflation and under-inflation. A calibrated spring which resists movement of an air flow control rod is utilized to control which color is shown in the window.

SUMMARY OF THE INVENTION

It is an object of the combination tire valve and pressure gauge of the present invention to provide a device which is substantially the same size as current tire valve stems and is usable as a replacement therefor.

It is another object of the present invention to provide a device which indicates the air pressure within a tire through a window formed in the device.

It is a further object of the present invention to provide a device having a minimal number of moving parts.

It is yet another object of the present invention to provide a device which indicates tire pressure utilizing numerals.

The combination tire valve and pressure gauge of the present invention is formed to be substantially the same size as current tire valve stems, such that it may be used as a replacement part therefor. The device includes a pressure sensitive bellows disposed within the stem, the movement of which is counteracted by a calibrated spring. Movements of the bellows, caused by changes in the tire pressure, are mechanically translated to a rotary motion of a pressure indicator. A window is formed in the tire stem to permit viewing of the pressure indicator, whereby different numerals corresponding to different tire pressures become visible in the window upon rotation of the indicator which is caused by movement of the bellows. An air channel is formed through the device to permit air to be pumped into the tire.

It is an advantage of the combination tire valve and pressure gauge of the present invention that it provides a device which is substantially the same size as current tire valve stems and is usable as a replacement therefor.

It is another advantage of the present invention that it provides a device which indicates the air pressure within a tire through a window formed in the device.

It is a further advantage of the present invention that it provides a device having a minimal number of moving parts.

It is yet another advantage of the present invention that it provides a device which indicates tire pressure utilizing numerals.

The foregoing and other objects, features and advantages of the present invention will be apparent from the following detailed description of the preferred embodiments which make reference to the several figures of the drawing.

IN THE DRAWING

DESCRIPTION OF THE PREFERRED EMBODIMENT

Figure 1:
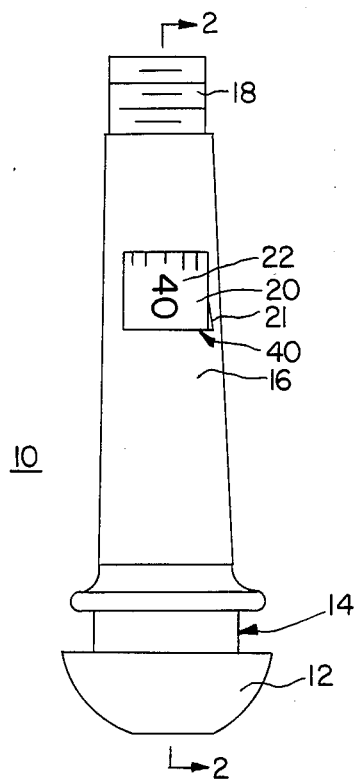
FIG. 1 is a side elevational view of the present invention.

As depicted in FIG. 1, the outward size and shape of the present invention is designed to be similar to the size and shape of currently available tire valve stems, such that the present invention may be used as a replacement part for existing tire valve stems. The combination tire valve and pressure gauge of the present invention 10, as depicted in FIG. 1, has an enlarged base 12 that is circular when viewed from below. A circumferentially disposed notch 14 is formed above the base and serves to form an airtight seal with the tire rim hole (not shown) into which the tire valve 10 is inserted for use. The upward portion 16 of the valve 10 is formed as a tapered cone which terminates in a projecting threaded nozzle portion 18, the outer threads 19 of which are utilized for the attachment of a cap (not shown). A cutout portion 21 is formed in the cone portion 16 of the valve 10 and a clear window 20 is engaged therein through which the user can view a pressure indicator 22 which serves to indicate the air pressure in the tire by means of an air pressure gauge mechanism of the present invention described hereinbelow.

Figure 2:
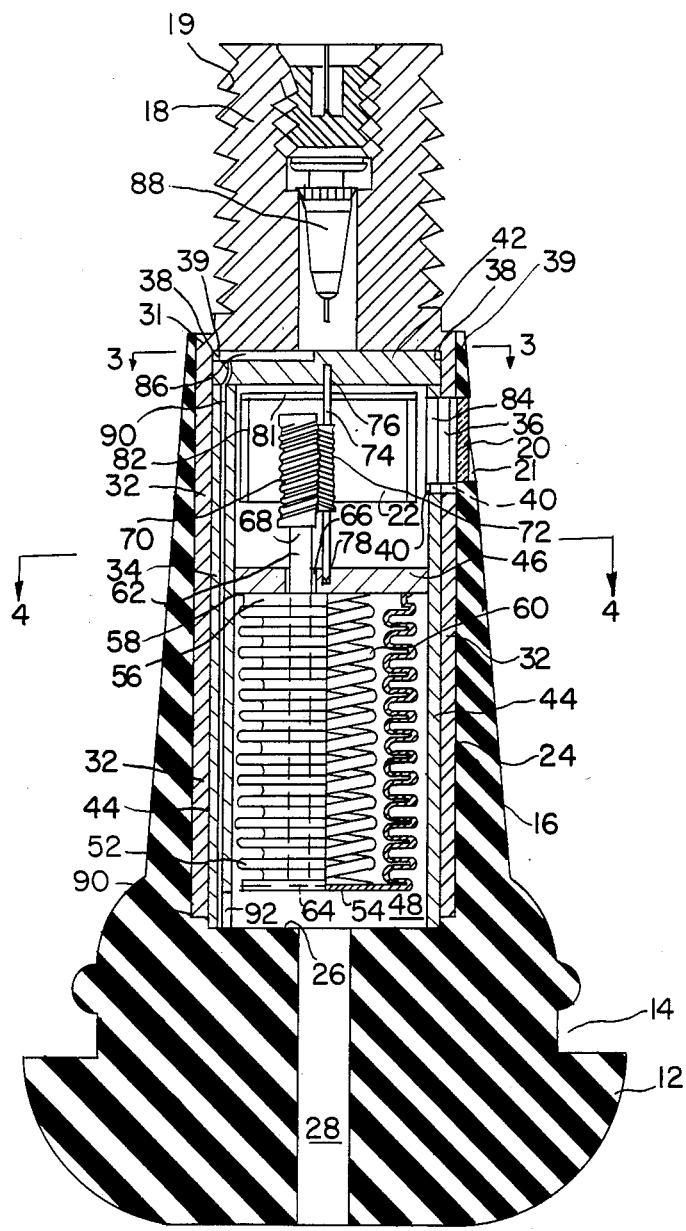
FIG. 2 is a side cross-sectional view of the present invention, taken along lines 2—2 of FIG. 1 and having cutaway portions.

FIG. 2 depicts a cross-sectional view of the valve 10, taken along lines 2—2 of FIG. 1, having cutaway portions to aid in the comprehension of the device. As depcited in FIG. 2, the projecting conical portion 16 of the valve 10 is formed with a hollow cylindrical cavity 24 defined by a bottom portion 26 having an air passage 28 formed therethrough to allow air to communicate through the valve 10 to the tire. The threaded nozzle portion 18 of the valve 10 is formed with a downwardly projecting hollow, cylindrically-shaped portion 31 which is defined by cylindrical walls 32, which walls 32 are sized to be tightly engaged in the hollow, cylindrical cavity 24 of the cone 16. The cylindrical walls 32 define a hollow cylindrical space 34 in which the pressure gauge components described hereinbelow reside. As is more fully described hereinafter, a cutout section 36 is formed in a portion of the cylindricl wall 32 in radial alignment with the cutout 21 formed in the cone 16 to permit the viewing of a pressure indicator 22 through window 20 formed in cone 16. The window 20 is formed from a visually transparent material, such as glass or preferably a clear plastic, and is sealingly engaged to the edges of the cutout 21, to prevent water or other foreign elements from entering the valve. It is preferable that the window 20 be shaped to magnify the numerals of the indicator 22 for ease of reading by the user. A small air passage hole 40 may be formed through the window seal at the edge of the window to permit air to pass into and out of the inner portion of the valve, such that equalization of air pressure within the valve components and the ambient may be maintained.

A pressure gauge assembly is disposed within the hollow cylindrically-shaped space 34 formed by the cylindrical walls 32. The gauge assembly includes a cylindrical housing having a cap 42 and cylindrical sidewalls 44, which are sized to engage the walls 32 in an airtight engagement.

An O-ring seal 38 is disposed in a circular notch 39 formed in the upper edge of cap 42 to facilitate the airtight engagement of the cap 42 and other pressure gauge assembly components with the cylindrical walls 32 of the nozzle portion 18 of the tire valve 10.

A support wall 46 is disposed substantially parallel to cap 42 and is engaged to the sidewalls 44 approximately mid-way through the length of the sidewalls 44 of the housing. The lower portion of the sidewalls 44 is not capped, such that air pressure from the air passage 28 through the base 12 of the device 10 communicates to the components of the gauge.

A generally cylindrical bellows 52 is disposed within the sidewalls 44. The bellows 52 is sealed at its lower end with a disk-shaped base 54 and joined to the support wall 46 at its upper end 56 in an airtight seal 58. Depending upon the material from which the bellows 52 is made, a calibrated coil spring 60, shown in the cutaway portion of the bellows 52 in FIG. 2, may be disposed within the bellows, such that one end of the coil spring 60 preses against the non-movable support wall 46 and the other end of the coil spring 60 presses against the closed base 54 of the bellows 52. Where a calibrated spring is utilized, it is therefore to be realized that tire air pressure from the air passage 28 will tend to compress the bellows 52 upwardly and the calibrated coil spring 60 will tend to oppose the upwardly collapsing pressure on the bellows 52.

A calibrated coil spring 60 is necessary where the bellows 52 material does not possess natural resiliency. That is, if the bellows 52 is composed of a resilient material, such as a metal such as copper, no calibrated coil spring is necessary because the resiliency of the bellows will cause it to resist the air pressure forces imposed upon it. However, if the bellows is composed of a non-resilient material such as a plastic, a calibrated coil spring 60 is necessary to provide the resilience to resist the air pressure forces.

A driving rod 62 is engagably disposed within the bellows 52 and parallel to the sidewalls 44 such that the distal end 64 of the rod 62 is engaged to the base 54 of the bellows 52. The rod 62 projects upwardly through the bellows 52 and through a hole 66 formed in the support wall 46. A driving worm gear 70 is engaged to the upper end 68 of the rod 62. A rotary worm gear 72 is disposed on a shaft 74 to matingly engage the driving worm gear 70. The ends of the shaft 74 are engaged in aligned bearing holes 76 and 78 formed in the cap 42 and support wall 46 respectively. The shaft 74 is aligned such that the central axis of the shaft 74 is axially aligned with the central axis of the cylindrical sidewalls 44, as is seen with the aid of FIG. 4. A rotary pressure indicator 22 is engaged to the rotary worm gear shaft 74 proximate its upper end. The indicator 22 is formed as a hollow cylinder having a disk-shaped cap 81 and sidewalls 82, which sidewalls 82 are disposed for viewing through the window 20. The shaft 74 engages the cap 81 at its center point. The sidewall 44 is formed with a cutout portion 84 which is disposed in radial alignment with cutout 36 formed in wall 32, such that the numerals disposed on the pressure indicator 22 will be visible through the window 20.

It is therefore to be appreciated that increasing air pressure from the tire which causes the bellows 52 to collapse such that the base 54 of the bellows 52 moves upwardly, will cause the driving rod 62 and its engaged driving worm gear 70 to move upwardly. The upward motion of the driving worm gear 70 will cause the rotary worm gear 72 to rotate due to its engagement therewith. Rotation of the rotary worm gear 72 will cause the pressure indicator 22 to rotate due to the engagement of the cap 81 of the pressure indicator 22 with the shaft 74 of the rotating worm gear 72. Rotation of the pressure indicator 22 is viewable to the user through the window 20, such that pressure indicating numerals printed on the outer surface of the cyindrical wall 82 of the indicator 22 may be viewed.

Figure 3:
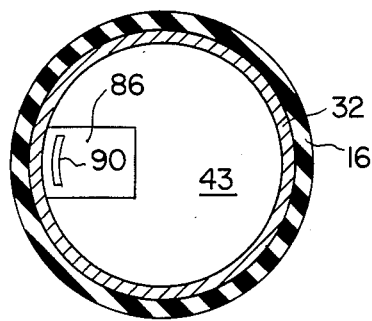
FIG. 3 is a cross-sectional top view of the present invention, taken along lines 3—3 of FIG. 2.
Figure 4:
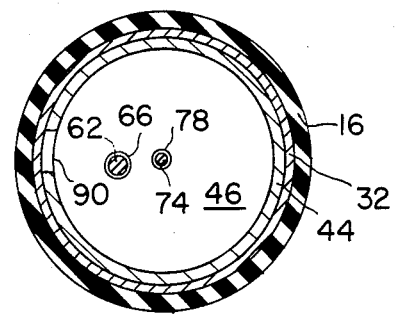
FIG. 4 is a cross-sectional view of the present invention, taken along lines 4—4 of FIG. 2.

As is shown in FIGS. 2, 3 and 4, an air channel 90 is formed through a portion of the cylindrical wall 44 to permit air to be pumped into the tire. An air passage recess 86 is formed in the top surface of the cap 42 to permit air to pass from the standard tire check valve 88 disposed in the threaded nozzle 18 of the device 10. A lower portion 92 of the wall 44 is cut away proximate the lower end of the air passage 90 to permit air to pass therefrom into the air channel 28 formed through the base 12 of the valve 10. It is therefore to be realized that air may be pumped through the check valve 88 through the cutaway portion 86 of the cap 42, through the air passage 90 formed in the wall 44, through the cutaway portion 92 formed in the lower portion of the wall 44 and into the air passage 28 formed in the base 12 of the valve 10 and thence into the tire.

The operation of the device, as described hereinabove, is facilitated by the axial alignment of the worm gear support rod 74 with the central axis of the cylindrical sidewalls 44, such that the rotary pressure indicator rotates freely and centrally within the sidewalls 44. The engagement of the driving worm gear 70 with the rotary worm gear 72 is facilitated through a tight, slideable engagement of the driving rod 62 within the hole 66 formed in the support wall 46. A tight, yet slideable engagement of the driving rod 62 within the hole 66 will tend to promote engagement of the driving worm gear 70 with the rotary worm gear 72, and proper operation of the device. Likewise, the ends of the rotary worm gear shaft 74 are snugly, yet rotatably, engaged within bearing holes 76 and 78, such that the engagement of the rotary worm gear 72 with the driving worm gear 70 is assured.

While the invention has been particularly shown and described with reference to certain preferred embodiments, it will be understood by those skilled in the art that various alterations and modifications in form and detail may be made therein. Accordingly, it is intended that the following claims cover all such alterations as fall within the true spirit and scope of the invention.

What I claim is:

1. A combination tire valve and pressure gauge formed for disposition within a tire valve stem, comprising:
    a housing being fixedly engaged within said tire valve stem;
    a tire air pressure sensitive means being engaged within said housing and functioning to produce movement of a portion thereof upon exposure to changing tire air pressure; said tire air pressure sensitive means being in pneumatic communication with the air pressure within said tire;
    said tire air pressure sensitive means including a bellows being substantially cylindrical in shape and formed for collapsible movement along the central axis thereof, and wherein a calibrated spring is disposed within said bellows and operable to resist the movement of said bellows;
    a driving rod being engaged to said bellows and slidably engaged within said housing, such that movement of said bellows results in axial movement of said driving rod along the linear axis thereof;
    a rotational engagement means being mounted on a rotatable shaft which is journaled in said housing, said rotational engagement means being matingly engaged to said driving rod and operating to convert said axial movement of said driving rod into rotational movement of said shaft;
    said driving rod having a first end and a second end, said first end of said driving rod being fixedly engaged to said bellows and said second end of said driving rod being disposed proximate said rotational engagement means, and wherein said rotational engagement means includes a first worm gear being engaged to said driving rod proximate said second end thereof and a second worm gear being disposed upon said shaft in meshing engagement with said first worm gear;
    a pressure indicator means being engageably mounted on said shaft and rotatable within said housing, said pressure indicator means having numerals disposed thereon for indicating the air pressure within said tire;
    a pressure indicator viewing means being formed through said tire stem and said housing proximate said pressure indicator means and operating to permit the visual inspection of said pressure indicator means whereby information related to the tire air pressure may be visually obtained.

2. The device as described in claim 1 wherein an air channel is formed in said housing and disposed to permit air to be pumped through said tire valve stem and into said tire.

* * * * *